United States Patent [19]

Ritsko et al.

[11] Patent Number: 4,710,368

[45] Date of Patent: Dec. 1, 1987

[54] HIGH PURITY HIGH SURFACE AREA ALPHA CRYSTALLINE SILICON NITRIDE

[75] Inventors: Joseph E. Ritsko; Howard L. Acla, both of Towanda, Pa.

[73] Assignee: GTE Products Corporation, Stamford, Conn.

[21] Appl. No.: 864,614

[22] Filed: May 19, 1986

Related U.S. Application Data

[63] Continuation-in-part of Ser. No. 748,080, Jun. 24, 1985.

[51] Int. Cl.[4] .................... C01B 21/068; C01B 33/06
[52] U.S. Cl. ...................................... 423/344; 423/406
[58] Field of Search ............................... 423/344, 406

[56] References Cited

U.S. PATENT DOCUMENTS

| | | | |
|---|---|---|---|
| 1,539,342 | 5/1925 | Williams | 423/338 |
| 4,122,155 | 10/1978 | Prochazka et al. | 423/344 |
| 4,514,370 | 4/1985 | Inoue et al. | 423/344 |
| 4,590,053 | 5/1986 | Hashimoto et al. | 423/344 |

FOREIGN PATENT DOCUMENTS 0156311 9/1982 Japan .................................. 423/344

OTHER PUBLICATIONS

Chemical Abstracts, 99:199568p, Manufacture of Silicon Nitride Useful for Ceramic Materials, Denki Kagaku, 9/8/83.

Primary Examiner—John F. Niebling
Assistant Examiner—Lori S. Freeman
Attorney, Agent, or Firm—Donald R. Castle; L. Rita Quatrini

[57] ABSTRACT

High purity silicon nitride particles are disclosed which are essentially alpha crystalline and which have a surface area of greater than about 25 m²/g.

4 Claims, 1 Drawing Figure

X-RAY DIFFRACTION PATTERNS OF $Si_3N_4$

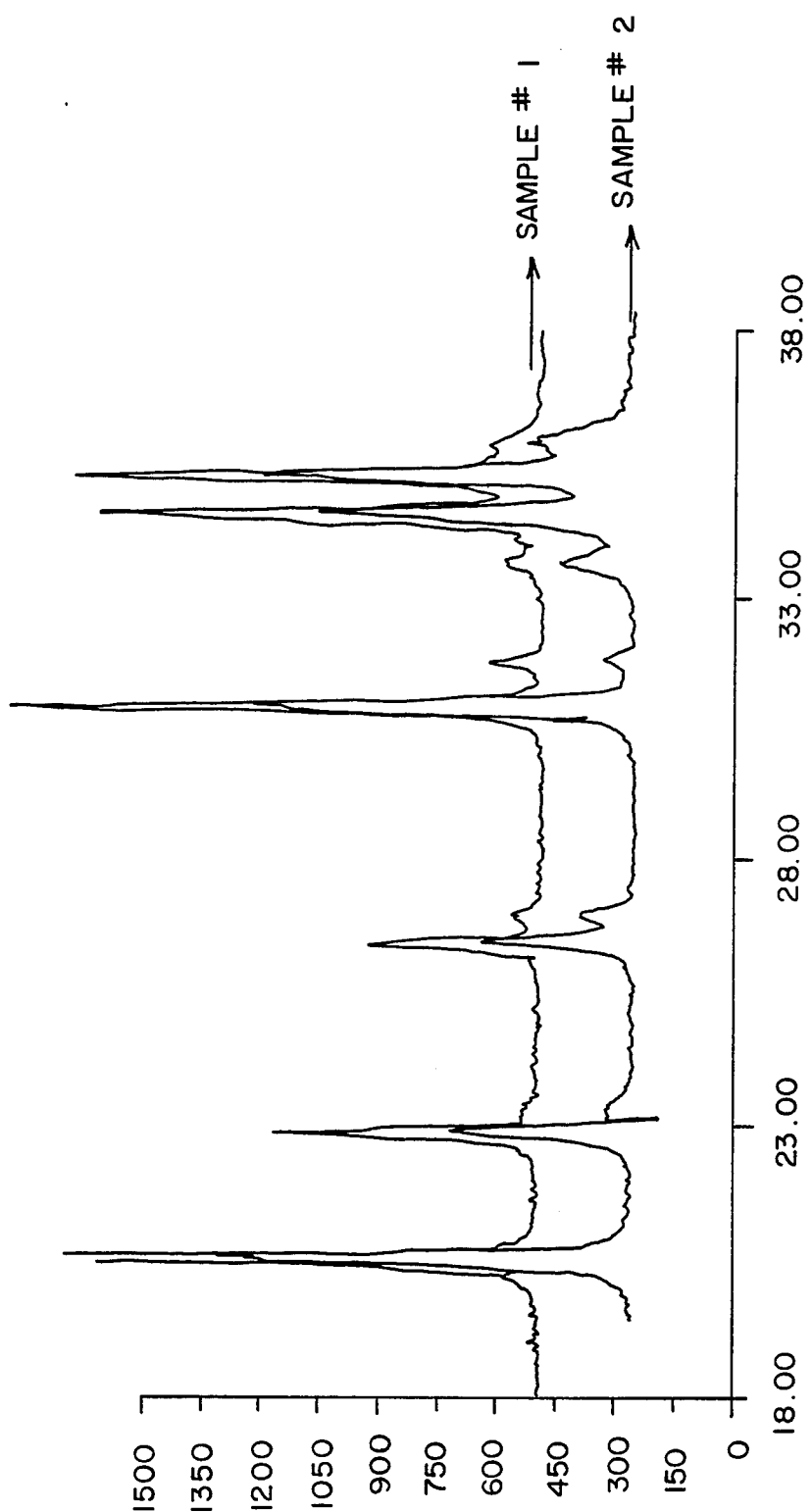

HIGH PURITY HIGH SURFACE AREA ALPHA CRYSTALLINE SILICON NITRIDE

This application is a continuation-in-part of application Ser. No. 748,080, entitled "High Purity High Surface Area Silicon Nitride", filed June 24, 1985, and assigned to the same assignee as the present application.

BACKGROUND OF THE INVENTION

This invention relates to high purity high surface area alpha crystalline silicon nitride having a surface area of greater than about 25 m$^2$/g.

Silicon nitride is a refractory fibrous material. Depending on the length of the fibers and how they are processed, the material can be used in cutting tools, engines, reinforcing cast metal parts, or, by using the longer fibers, it can be made into fibers, felts for furnace walls and roof insulation, and flame curtains.

There are several known methods for producing silicon nitride, such as:

1. The reaction between elemental silicon and nitrogen;
2. The reaction between SiCl$_4$ and anhydrous ammonia; and
3. The reaction of SiO$_2$ with carbon in the presence of nitrogen.

A disadvantage of reaction 1 is that pure silicon is expensive and it also requires grinding to powder before it will react with the nitrogen. Grinding introduces impurities, making the process impractical if a pure product is required. In 2, the reaction between SiCl$_4$ and ammonia produces products which are both difficult and expensive to remove. During the process, ammonium chloride is produced which must be sublimed off without losing the silicon nitride. This is difficult to do because the silicon nitride is so fine that it is carried out with the ammonium chloride. Furthermore, the process is difficult to control because any oxygen present causes oxidation to SiO$_2$. In 3 the carbon source has been supplied in powder form. With the carbon in powder form, it is difficult to obtain a uniform mixture with the SiO$_2$. Furthermore, some powder sources of carbon are not pure, and the result is relatively impure silicon nitride.

U.S. Pat. Nos. 4,264,565, 4,122,152, 4,368,180, 4,117,095, and 4,122,155 disclose processes for producing silicon nitride. Although U.S. Pat. No. 4,122,155 dicsloses silicon nitride of high surface area, it does not teach the high surface area values of the present invention for alpha crystalline silicon nitride.

SUMMARY OF THE INVENTION

In accordance with one aspect of this invention, there is provided high purity silicon nitride particles which are essentially alpha crystalline and which have a surface area of greater than about 25 m$^2$/g.

BRIEF DESCRIPTION OF THE FIGURE

FIG. 1 shows x-ray diffraction patterns of the high surface area silicon nitride of the present invention.

DETAILED DESCRIPTION OF THE INVENTION

For a better understanding of the present invention, together with other and further objects, advantages, and capabilities thereof, reference is made to the following disclosure and appended claims in connection with the above described FIGURE and description of some of the aspects of the invention.

In producing the silicon nitride product of the present invention, silicon tetrachloride is first contacted with water to hydrolyze the silicon tetrachloride and form a two phase system consisting essentially of a solid phase which is essentially silica gel and a liquid phase which is essentially water and hydrochloric acid. Typically from about 5 to about 8 weight parts of water are used per weight part of the silicon tetrachloride.

The resulting two phase system is then heated at a sufficient temperature for a sufficient time to partially dehydrate the silica gel. The partial dehydration of the silica gel makes it easier to filter in subsequent operations. The partial dehydration also serves to lower the oxygen content in the final silicon nitride product. The heating temperature is preferably at least about 80° C. At lower temperatures, the oxygen is not significantly lowered in the resulting silicon nitride product. The preferred temperature range is from about 80° C. to about 100° C. The heating time depends on the temperature. For example, at a temperature of about 80° C., the heating time is generally about 1 hour.

The solid phase is removed from the liquid phase by any standard technique, and preferably by filtration.

An aqueous solution is then formed of a water soluble organic source of carbon. The solution can be of any convenient concentration. Usually the concentration is from about 200 to about 250 grams of the carbon source per liter. The water soluble organic carbon source is preferably polyvinyl alcohol, sugars, or polyglycols such as polyethylene glycols. The water soluble carbon source has the advantage of being efficiently mixed with the silica gel for the subsequent reactions, is readily decomposed into elemental carbon, and is of required purity so that the purity of the final silicon nitride product will not be adversely affected.

A slurry is first formed of the solid phase in the aqueous solution of the carbon source.

A dispersing agent is added to the slurry to disperse the silica gel. The preferred dispersing agent is acetic acid, when acetic acid is used, it is added in an amount equal to about 10% by weight of the contained SiO$_2$.

The resulting dispersing agent-treated slurry is made basic by adjusting the pH to greater than about 7, and preferably to from about 7 to about 8, preferably with ammonia. On the basic side the silica gel is softer and easier to handle than in the acid range and is not corrosive to equipment.

The resulting pH adjusted slurry is heated at a sufficient temperature for a sufficient time to remove essentially all of the water therefrom and to decompose the water soluble organic source of carbon to elemental carbon and produce a powder mixture of silicon dioxide and carbon. If the water is removed in an air atmosphere, the temperatures generally do not rise above about 200° C., otherwise burning can occur. If removal is done in a nitrogen atmosphere, higher temperatures, for example, from about 300° C. to about 400° C. can be used.

The resulting powder mixture is deagglomerated. This can be done by any standard method such as by vibratory milling.

At this point it is preferred to classify the powder mixture usually by passing the powder through a 200 mesh screen. That portion of the powder which passes through the screen is preferably used in the subsequent heating steps.

The deagglomerated powder is then heated in a nitrogen atmosphere at a sufficient temperature for a sufficient time to form a reaction product the major portion of which is silicon nitride. The carbon serves to reduce the $SiO_2$ to Si. The heating is generally done in a conventional furnace with the material preferably in carbon boats. The heating temperatures are generally from about 1450° C. to about 1500° C. The heating time depends on the size of the charge of the material and on the temperature. These temperature and time conditions result in the silicon nitride product being essentially alpha crystalline. At least about 85% by weight of the silicon nitride is alpha silicon nitride.

The reaction product is then heated in an air atmosphere at a sufficient temperature for a sufficient time to remove essentially all of the carbon from the reaction product and form a high purity high surface area silicon nitride. The heating temperatures are generally from about 600° C. to about 650° C. Heating times depend on the size of the charge of the reaction product and on the temperature. The heating is generally done in a conventional furnace.

The resulting silicon nitride product has an oxygen content of less than about 1% by weight and a carbon content of less than about 1% by weight. A typical quantitative analysis of silicon nitride of this invention is as follows in approximate weight parts per million: Al-82, Ca-33, Cu-<1.0, Mg-3.4, Ni-<5.0, Mo-5.2, Cr-<10, and Fe-55.

By the process described above high purity silicon nitride is produced, which is essentially alpha crystalline and which has a surface area of greater than about 25 $m^2/g$ and preferably from about 25 to about 40 $m^2/g$.

To more fully illustrate this invention, the following nonlimiting examples are presented. All parts, portions, and percentages are on a weight basis unless otherwise stated.

EXAMPLE 1

The following is a typical procedure which is followed to obtain the silicon nitride of this invention:

To about 195 parts of silicon tetrachloride are added to about 1200 parts of deionized water and hydrolyzed. The resulting silica gel is heated at from about 80° C. to about 100° C. for about 1 hour and filtered to remove the resulting hydrochloric acid. About 250 parts of polyvinyl alcohol are added to about 1700 parts of water and heated to solubilize the alcohol. To the resulting aqueous solution of polyvinyl alcohol which is being agitated, is added the silica gel. About 37 parts of acetic acid are added and the resulting slurry is made slightly basic by addition of ammonium hydroxide. The resulting pH adjusted slurry is then dried in air at about 200° C. The resulting dried powder is then milled and screened through a 200 mesh screen. The resulting screened $SiO_2/C$ mixture is heated in a furnace in carbon boats at about 1480° C. in a nitrogen atmosphere. The resulting silicon nitride is then heated in an air atmosphere at from about 600° C. to about 650° C. to remove excess carbon. The resulting silicon nitride product has an oxygen content of less than about 1% by weight and a carbon content of less than about 1% by weight, and a surface area of from about 25 to about 40 $m^2/g$. In FIG. 1 are shown x-ray diffraction patterns of silicon nitride produced by the process of this invention. The FIGURE shows the silicon nitride to be highly crystalline.

EXAMPLE 2

The surface area values and the calculated effective diameter of silicon nitride of this invention made by the above described process and of silicon nitride produced by other processes are given below for purposes of comparison.

| Process Type | Surface Area $m^2/g$ *B.E.T. | Calculated Effective Diameter Micrometers | **Percent Alpha |
| --- | --- | --- | --- |
| 1. Described in this invention (Sample #1 in FIGURE | 36.33 | .06 | 96.4 |
| 2. Described in this invention (Sample #2 in FIGURE) | 26.25 | .08 | 88.9 |
| 3. Prior Art - Reaction Between $SiCl_4$ and $NH_3$ | 5.51 | .35 | |
| 4. As described in this invention except that powdered carbon is used | 5.63 | .34 | |

*Standard method of measurement developed by Brunhauer, Emmett, and Teller which involves a measurement of the chemical adsorption of a gas on the surface of the particles being measured.
**Determined by x-ray diffraction.

The above data shows that high surface area silicon nitride can be produced by the method described in this invention as shown by numbers 1 and 2, than with the other processes shown. Correspondingly, the diameter of the silicon nitride particles produced by the method described in this invention is smaller than that of silicon nitride produced by the other processes. Samples 1 and 2 are shown to have a high degree of alpha.

What is claimed is:

1. High purity silicon nitride particles which are essentially alpha crystalline, said silicon nitride particles having a surface area of greater than about 25 $m^2/g$.

2. Silicon nitride particles of claim 1 wherein the surface area is from about 25 to about 40 $m^2/g$.

3. Silicon nitride particles of claim 1 wherein the oxygen content is less than about 1% by weight and the carbon content is less than about 1% by weight.

4. Silicon nitride particles of claim 1 wherein at least about 85% by weight is alpha silicon nitride.

* * * * *